US008509498B2

(12) United States Patent
Petrescu et al.

(10) Patent No.: US 8,509,498 B2
(45) Date of Patent: *Aug. 13, 2013

(54) REAL-TIME FACE TRACKING IN A DIGITAL IMAGE ACQUISITION DEVICE

(75) Inventors: Stefan Petrescu, Bucharest (RO); Peter Corcoran, Claregalway (IE); Eran Steinberg, San Francisco, CA (US); Petronel Bigioi, Galway (IE); Alexandru Drimbarean, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,738

(22) Filed: Sep. 26, 2011

(65) Prior Publication Data

US 2012/0070087 A1    Mar. 22, 2012

Related U.S. Application Data

(63) Continuation of application No. 12/063,089, filed as application No. PCT/EP2007/005330 on Jun. 18, 2007, now Pat. No. 8,055,029, which is a continuation of application No. 11/464,083, filed on Aug. 11, 2006, now Pat. No. 7,315,631.

(51) Int. Cl.
*G06K 9/62*    (2006.01)

(52) U.S. Cl.
USPC ............................................ 382/118

(58) Field of Classification Search
None
See application file for complete search history.

(56) References Cited

U.S. PATENT DOCUMENTS

| 4,448,510 | A | 5/1984 | Murakoshi |
| 5,715,325 | A | 2/1998 | Bang et al. |
| 5,912,980 | A | 6/1999 | Hunke |
| 6,292,575 | B1 | 9/2001 | Bortolussi et al. |
| 6,445,810 | B2 | 9/2002 | Darrell et al. |
| 6,463,163 | B1 | 10/2002 | Kresch |
| 6,526,156 | B1 | 2/2003 | Black et al. |

(Continued)

FOREIGN PATENT DOCUMENTS

| EP | 0578508 A2 | 1/1994 |
| EP | 1398733 A1 | 3/2004 |

(Continued)

OTHER PUBLICATIONS

PCT Notification of Transmittal of the International Search Report and the Written Opinion of the International Searching Authority, or the Declaration, for PCT Application No. PCT/EP2007/005330, dated Sep. 28, 2007, 11 pages.

(Continued)

*Primary Examiner* — Brian P Werner
(74) *Attorney, Agent, or Firm* — Andrew V. Smith

(57) ABSTRACT

An image processing apparatus for tracking faces in an image stream iteratively receives an acquired image from the image stream including one or more face regions. The acquired image is sub-sampled at a specified resolution to provide a sub-sampled image. An integral image is then calculated for a least a portion of the sub-sampled image. Fixed size face detection is applied to at least a portion of the integral image to provide a set of candidate face regions. Responsive to the set of candidate face regions produced and any previously detected candidate face regions, the resolution is adjusted for sub-sampling a subsequent acquired image.

14 Claims, 5 Drawing Sheets

(56) References Cited

U.S. PATENT DOCUMENTS

| | | |
|---|---|---|
| 6,529,630 B1 | 3/2003 | Kinjo |
| 6,549,641 B2 | 4/2003 | Ishikawa et al. |
| 6,661,907 B2 | 12/2003 | Ho et al. |
| 6,747,690 B2 | 6/2004 | Molgaard |
| 7,120,279 B2 * | 10/2006 | Chen et al. ............... 382/118 |
| 7,430,369 B2 | 9/2008 | Fukui |
| 8,055,029 B2 | 11/2011 | Petrescu et al. |
| 2002/0102024 A1 | 8/2002 | Jones et al. |
| 2002/0141640 A1 | 10/2002 | Kraft |
| 2003/0133600 A1* | 7/2003 | Huang et al. ............... 382/118 |
| 2005/0013479 A1 | 1/2005 | Xiao et al. |
| 2005/0018923 A1 | 1/2005 | Messina et al. |
| 2005/0147278 A1 | 7/2005 | Rui et al. |
| 2006/0029265 A1* | 2/2006 | Kim et al. ............... 382/118 |
| 2006/0204034 A1 | 9/2006 | Steinberg et al. |
| 2006/0204055 A1 | 9/2006 | Steinberg et al. |
| 2006/0204056 A1 | 9/2006 | Steinberg et al. |
| 2006/0227997 A1 | 10/2006 | Au et al. |
| 2007/0110305 A1 | 5/2007 | Corcoran et al. |
| 2007/0160307 A1 | 7/2007 | Steinberg et al. |
| 2007/0201725 A1 | 8/2007 | Steinberg et al. |
| 2007/0201726 A1 | 8/2007 | Steinberg et al. |
| 2007/0273504 A1 | 11/2007 | Tran |
| 2008/0013799 A1 | 1/2008 | Steinberg et al. |
| 2008/0013800 A1 | 1/2008 | Steinberg et al. |
| 2008/0037827 A1 | 2/2008 | Corcoran et al. |
| 2008/0037838 A1 | 2/2008 | Ianculescu et al. |
| 2008/0037839 A1 | 2/2008 | Corcoran et al. |
| 2008/0037840 A1 | 2/2008 | Steinberg et al. |
| 2008/0080744 A1 | 4/2008 | Tanaka |
| 2012/0070087 A1 | 3/2012 | Petrescu et al. |

FOREIGN PATENT DOCUMENTS

| | | |
|---|---|---|
| EP | 2256666 A2 | 8/2010 |
| EP | 2256666 A3 | 11/2011 |
| JP | 06-030318 A | 2/1994 |
| JP | 2000-354247 A | 12/2000 |
| JP | 2005-302056 A | 10/2005 |
| JP | 2006-087083 A | 3/2006 |
| JP | 2006-129271 A | 5/2006 |
| JP | 2009-258770 A | 11/2009 |
| WO | 01/33497 A1 | 5/2001 |
| WO | 2006/030519 A1 | 3/2006 |
| WO | 2008/017343 A1 | 2/2008 |
| WO | 2008/018887 A1 | 2/2008 |

OTHER PUBLICATIONS

PCT International Preliminary Report on Patentability for PCT Application No. PCT/EP2007/005330, dated Aug. 29, 2008, 14 Pages.

Nayak et al.: "Automatic illumination correction for scene enhancement and object tracking" Image and Vision Computing, Guildford, GB, vol. 24, No. 9, Sep. 2006, pp. 949-959, XP005600656 ISSN:0262-8856, DOI:http://dx.doi.org/10.1016/j.imavis.2006.02.017.

Patent Abstracts of Japan, publication No. 2009-258770A, publication date: Nov. 6, 2009, for Image Processing Method, Image Processor, Image Processing Program, and Imaging Device.

Patent Abstracts of Japan, publication No. 06-030318A (1994), publication date: Feb. 4, 1994, for Video Camera System.

Patent Abstracts of Japan, publication No. 2005-302056A, publication date: Oct. 27, 2005, for Pattern Extracting Apparatus.

Patent Abstracts of Japan, publication No. 2000-354247A, publication date: Dec. 19, 2000, for Image Processing Unit.

Patent Abstracts of Japan, publication No. 2006-087083A, publication date: Mar. 30, 2006, for Imaging Device, and Control Method of Imaging Device.

Patent Abstracts of Japan, publication No. 2006-129271A, publication date: May 18, 2006, for Camera, Image Processing Apparatus and Image Processing Method, and Image Processing Program.

EPO Communication regarding the transmission of the European search report, Partial European search report, for European patent application No. 10163739.5, report dated Jun. 29, 2011, 6 pages.

EPO Communication regarding the transmission of the European search report, European search opinion, and European search report, for European patent application No. 10163739.5, report dated Oct. 17, 2011, 9 pages.

Pham M-T et al: "Detection Caching for Faster Object Detection", Proc. IEEE Workshop on Modeling People and Human Interaction (PHI), Beijing, China, 2005. [Online] Oct. 15, 2005, pp. 1-8, XP002562026, Retrieved from the Internet: URL:http://web.mysites.ntu.edu.sg/astjcham/public/Shared%20Documents/papers/phamcham-phi05-hdr.pdf.

Chow G et al: "Towards a System for Automatic Facial Feature Detection", Pattern Recognition, Elsevier, GB, vol. 26, No. 12, Dec. 1, 1993, pp. 1739-1755, XP000420368, ISSN: 0031-3203, DOI: DOI: I0.1016/0031-3203(93)90173-T.

Zhang D D Ed-Zhang D D: "Automated Biometrics/ Chapter 7: Face Recognition", Jan. 1, 2000, Automated Biometrics: Technologies and Systems, Kluwer Academic Publishers, Norwell, MA, US, pp. 137-158 XP002485295, ISBN: 978-0-7923-7856-3.

* cited by examiner

REAL-TIME FACE TRACKING IN A DIGITAL IMAGE ACQUISITION DEVICE

CLAIM OF PRIORITY AND CROSS-REFERENCE TO RELATED APPLICATIONS

This application is a Continuation of U.S. patent application Ser. No. 12/063,089, filed Feb. 6, 2008, now U.S. Pat. No. 8,055,029; which is a 371 of PCT Application Ser. No. PCT/EP2007/005330, filed Jun. 18, 2007; which claims the benefit of priority to U.S. patent application Ser. No. 11/464,083, filed on Aug. 11, 2006, issued as U.S. Pat. No. 7,315,631.

FIELD OF THE INVENTION

The present invention provides an improved method and apparatus for image processing in acquisition devices. In particular the invention provides improved real-time face tracking in a digital image acquisition device.

DESCRIPTION OF THE RELATED ART

Face tracking for digital image acquisition devices include methods of marking human faces in a series of images such as a video stream or a camera preview. Face tracking can be used to indicate to a photographer locations of faces in an image, thereby improving acquisition parameters, or allowing post processing of the images based on knowledge of the locations of the faces.

In general, face tracking systems employ two principle modules: (i) a detection module for locating new candidate face regions in an acquired image or a sequence of images; and (ii) a tracking module for confirming face regions.

A well-known fast-face detection algorithm is disclosed in US 2002/0102024, hereinafter Viola-Jones, which is hereby incorporated by reference. In brief, Viola-Jones first derives an integral image from an acquired image, which is usually an image frame in a video stream. Each element of the integral image is calculated as the sum of intensities of all points above and to the left of the point in the image. The total intensity of any sub-window in an image can then be derived by subtracting the integral image value for the top left point of the sub-window from the integral image value for the bottom right point of the sub-window. Also, intensities for adjacent sub-windows can be efficiently compared using particular combinations of integral image values from points of the sub-windows.

In Viola-Jones, a chain (cascade) of 32 classifiers based on rectangular (and increasingly refined) Haar features are used with the integral image by applying the classifiers to a sub-window within the integral image. For a complete analysis of an acquired image, this sub-window is shifted incrementally across the integral image until the entire image has been covered.

In addition to moving the sub-window across the entire integral image, the sub window is also scaled up/down to cover the possible range of face sizes. In Viola-Jones, a scaling factor of 1.25 is used and, typically, a range of about 10-12 different scales are used to cover the possible face sizes in an XVGA size image.

It will therefore be seen that the resolution of the integral image is determined by the smallest sized classifier sub-window, i.e. the smallest size face to be detected, as larger sized sub-windows can use intermediate points within the integral image for their calculations.

A number of variants of the original Viola-Jones algorithm are known in the literature. These generally employ rectangular, Haar feature classifiers and use the integral image techniques of Viola-Jones.

Even though Viola-Jones is significantly faster than previous face detectors, it still involves significant computation and a Pentium-class computer can only just about achieve real-time performance. In a resource-restricted embedded system, such as a hand held image acquisition device, e.g., a digital camera, a hand-held computer or a cellular phone equipped with a camera, it is generally not practical to run such a face detector at real-time frame rates for video. From tests within a typical digital camera, it is possible to achieve complete coverage of all 10-12 sub-window scales with a 3-4 classifier cascade. This allows some level of initial face detection to be achieved, but with undesirably high false positive rates.

In US 2005/0147278, by Rui et al., which is hereby incorporated by reference, a system is described for automatic detection and tracking of multiple individuals using multiple cues. Rui et al. disclose using Viola-Jones as a fast face detector. However, in order to avoid the processing overhead of Viola-Jones, Rui et al. instead disclose using an auto-initialization module which uses a combination of motion, audio and fast face detection to detect new faces in the frame of a video sequence. The remainder of the system employs well-known face tracking methods to follow existing or newly discovered candidate face regions from frame to frame. It is also noted that Rui et al. involves some video frames being dropped in order to run a complete face detection process.

US 2006/00029265, Kim and U.S. Pat. No. 7,190,829, Zhang each disclosure applying a skin color filter to an acquired image to produce a skin map on which face detection is subsequently performed to restrict the processing required to perform face detection and tracking.

SUMMARY OF THE INVENTION

Methods are provided for detecting, tracking or recognizing faces, or combinations thereof, within acquired digital images of an image stream. An image processing apparatus is also provided including one or more processors and one or more digital storage media having digitally-encoded instructions embedded therein for programming the one or more processors to perform any of these methods.

A first method is provided for detecting faces in an image stream using a digital image acquisition device. An acquired image is received from an image stream including one or more face regions. An acquired image is sub-sampled at a specified resolution to provide a sub-sampled image. One or more regions of said acquired image are identified that predominantly include skin tones. A corresponding integral image is calculated for a least one of the skin tone regions of the sub-sampled acquired image. Face detection is applied to at least a portion of the integral image to provide a set of one or more candidate face regions each having a given size and a respective location.

By only running the face detector on regions predominantly including skin tones, more relaxed face detection can be used, as there is a higher chance that these skin-tone regions do in fact contain a face. So, faster face detection can be employed to more effectively provide similar quality results to running face detection over the whole image with stricter face detection involved in positively detecting a face.

BRIEF DESCRIPTION OF THE DRAWINGS

Embodiments of the invention will now be described by way of example, with reference to the accompanying drawings, in which.

DETAILED DESCRIPTION OF THE PREFERRED EMBODIMENTS

Figure 1:
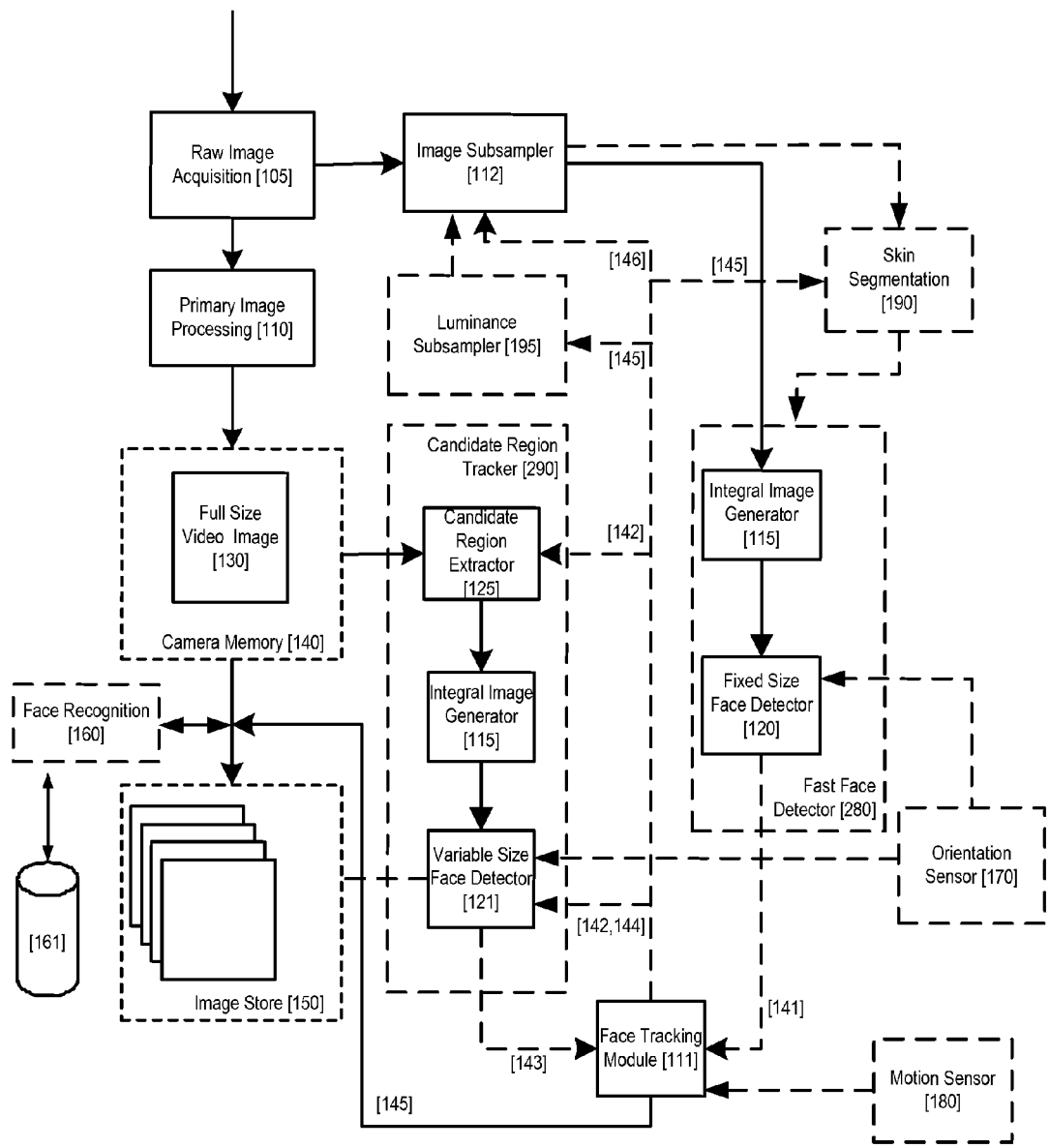
FIG. 1 is a block diagram illustrating principle components of an image processing apparatus in accordance with a preferred embodiment.

FIG. 1 shows the primary subsystems of a face tracking system in accordance with a preferred embodiment. The solid lines indicate the flow of image data; the dashed line indicate control inputs or information outputs (e.g. location(s) of detected faces) from a module. In this example an image processing apparatus can be a digital still camera (DSC), a video camera, a cell phone equipped with an image capturing mechanism or a hand help computer equipped with an internal or external camera, or a combination thereof.

A digital image is acquired in raw format from an image sensor (CCD or CMOS) [105] and an image subsampler [112] generates a smaller copy of the main image. Most digital cameras already contain dedicated hardware subsystems to perform image subsampling, for example to provide preview images to a camera display. Typically, the subsampled image is provided in bitmap format (RGB or YCC). In the meantime, the normal image acquisition chain performs post-processing on the raw image [110] which typically includes some luminance and color balancing. In certain digital imaging systems the subsampling may occur after such post-processing, or after certain post-processing filters are applied, but before the entire post-processing filter chain is completed.

The subsampled image is next passed to an integral image generator [115] which creates an integral image from the subsampled image. This integral image is next passed to a fixed size face detector [120]. The face detector is applied to the full integral image, but as this is an integral image of a subsampled copy of the main image, the processing involved in the face detection is proportionately reduced. If the subsampled image is ¼ of the main image, e.g., has ¼ the number of pixels and/or ¼ the size, then the processing time involved is only about 25% of that for the full image.

This approach is particularly amenable to hardware embodiments where the subsampled image memory space can be scanned by a fixed size DMA window and digital logic to implement a Haar-feature classifier chain can be applied to this DMA window. Several sizes of classifiers may alternatively be used (in a software embodiment), or multiple fixed-size classifiers may be used (in a hardware embodiment). An advantage is that a smaller integral image is calculated.

After application of the fast face detector [280] any newly detected candidate face regions [141] are passed onto a face tracking module [111] where any face regions confirmed from previous analysis [145] may be merged with new candidate face regions prior to being provided [142] to a face tracker [290].

The face tracker [290] provides a set of confirmed candidate regions [143] back to the tracking module [111]. Additional image processing filters are preferably applied by the tracking module [111] to confirm either that these confirmed regions [143] are face regions or to maintain regions as candidates if they have not been confirmed as such by the face tracker [290]. A final set of face regions [145] can be output by the module [111] for use elsewhere in the camera or to be stored within or in association with an acquired image for later processing either within the camera or offline; as well as to be used in a next iteration of face tracking.

After the main image acquisition chain is completed a full-size copy of the main image will normally reside in the system memory [140] of the image acquisition system. This may be accessed by a candidate region extractor [125] component of the face tracker [290] which selects image patches based on candidate face region data [142] obtained from the face tracking module [111]. These image patches for each candidate region are passed to an integral image generator [115] which passes the resulting integral images to a variable sized detector [121], as one possible example a VJ detector, which then applies a classifier chain, preferably at least a 32 classifier chain, to the integral image for each candidate region across a range of different scales.

The range of scales [144] employed by the face detector [121] is determined and supplied by the face tracking module [111] and is based partly on statistical information relating to the history of the current candidate face regions [142] and partly on external metadata determined from other subsystems within the image acquisition system.

As an example of the former, if a candidate face region has remained consistently at a particular size for a certain number of acquired image frames then the face detector [121] is applied at this particular scale and/or perhaps at one scale higher (i.e. 1.25 time larger) and one scale lower (i.e. 1.25 times lower).

As an example of the latter, if the focus of the image acquisition system has moved to approximately infinity, then the smallest scalings will be applied in the face detector [121]. Normally these scalings would not be employed as they would be applied a greater number of times to the candidate face region in order to cover it completely. It is worthwhile noting that the candidate face region will have a minimum size beyond which it should not decrease—this is in order to allow for localized movement of the camera by a user between frames. In some image acquisition systems which contain motion sensors, such localized movements may be tracked. This information may be employed to further improve the selection of scales and the size of candidate regions.

The candidate region tracker [290] provides a set of confirmed face regions [143] based on full variable size face detection of the image patches to the face tracking module [111]. Clearly, some candidate regions will have been confirmed while others will have been rejected, and these can be explicitly returned by the tracker [290] or can be calculated by the tracking module [111] by analyzing the difference between the confirmed regions [143] and the candidate regions [142]. In either case, the face tracking module [111] can then apply alternative tests to candidate regions rejected by the tracker [290] (as explained below) to determine whether these should be maintained as candidate regions [142] for the next cycle of tracking or whether these should indeed be removed from tracking.

Once the set of confirmed candidate regions [145] has been determined by the face tracking module [111], the module [111] communicates with the sub-sampler [112] to determine when the next acquired image is to be sub-sampled, and so provided to the detector [280], and also to provide the resolution [146] at which the next acquired image is to be sub-sampled.

Where the detector [280] does not run when the next image is acquired, the candidate regions [142] provided to the extractor [125] for the next acquired image will be the regions confirmed by the tracking module [111] from the last acquired image. On the other hand, when the face detector [280] provides a new set of candidate regions [141] to the face tracking module [111], these candidate regions are preferably merged with the previous set of confirmed regions [145] to provide the set of candidate regions [142] to the extractor [125] for the next acquired image.

It will be appreciated that, as described in co-pending application No. 60/892,883 filed Mar. 5, 2007 (Ref: FN182), in face detection processes such as disclosed in Violla-Jones, during analysis of a detection window and/or while oscillating around the detection window, a confidence level can be accumulated providing a probabilistic measure of a face being present at the location of the detection window. When the confidence level reaches a preset threshold for a detection window, a face is confirmed for the location of the detection window. Where a face detection process generates such a confidence level for a given location of detection window, the confidence level can be captured and stored as an indicator of the probability of a face existing at the given location, even if a face is not detected.

Alternatively, where a face detection process applies a sequence of tests each of which produce a Boolean "Face" or "No face" result, the extent to which the face detection process has progressed through the sequence before deciding no face exists at the location can be taken as equivalent to a confidence level and indicating the probability of a face existing at the given location. So for example, where a cascade of classifiers failed to detect a face at a window location at classifier 20 of 32, it could be taken that this location is more likely to include a face (possibly at a different scale or shifted slightly) than where a cascade of classifiers failed to detect a face at a window location at classifier 10 of 32.

Thus, when using real-time face tracking within a camera, on each frame of the preview stream, a current probability for each face region can be available, together with a cumulative probability which is determined from a history of each face region across the previous N preview images. In normal situations the cumulative probability is relatively high, say 70%+, and the current probability would be of the same order with an error factor of, say −10%. This information can be used in refined embodiments of the invention explained in more detail below to optimize the processing overhead required by face detection/tracking.

Zoom information may be obtained from camera firmware. Using software techniques which analyze images in camera memory 140 or image store 150, the degree of pan or tilt of the camera may be determined from one image to another.

In one embodiment, the acquisition device is provided with a motion sensor 180, as illustrated at FIG. 1, to determine the degree and direction of pan from one image to another, and avoiding the processing involved in determining camera movement in software.

Such motion sensor for a digital camera may be based on an accelerometer, and may be optionally based on gyroscopic principals within the camera, primarily for the purposes of warning or compensating for hand shake during main image capture. U.S. Pat. No. 4,448,510, to Murakoshi, which is hereby incorporated by reference, discloses such a system for a conventional camera, and U.S. Pat. No. 6,747,690, to Molgaard, which is also incorporated by reference, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometer may allow software control of the amplifier stage which allows the sensitivity to be adjusted.

The motion sensor 180 could equally be implemented with MEMS sensors of the sort which will be incorporated in next generation consumer cameras and camera-phones.

In any case, when the camera is operable in face tracking mode, i.e. constant video acquisition as distinct from acquiring a main image, shake compensation would typically not be used because image quality is lower. This provides the opportunity to configure the motion sensor 180 to sense large movements by setting the motion sensor amplifier module to low gain. The size and direction of movement detected by the sensor 180 is preferably provided to the face tracker 111. The approximate size of faces being tracked is already known, and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the locations of candidate regions as a function of the direction and size of the movement. Alternatively, the size of the region over which the tracking algorithms are applied may also be enlarged (and the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105,110 for full-sized images to employ normal shake compensation algorithms based on information from the motion sensor 180.

An alternative way of limiting the areas of an image to which the face detector 120 is to be applied involves identifying areas of the image which include skin tones. U.S. Pat. No. 6,661,907, which is hereby incorporated by reference, discloses one such technique for detecting skin tones and subsequently only applying face detection in regions having a predominant skin color.

In one embodiment, skin segmentation 190 is preferably applied to a sub-sampled version of the acquired image. If the resolution of the sub-sampled version is not sufficient, then a previous image stored in image store 150 or a next sub-sampled image can be used as long as the two images are not too different in content from the current acquired image. Alternatively, skin segmentation 190 can be applied to the full size video image 130.

In any case, regions containing skin tones are identified by bounding rectangles and these bounding rectangles are provided to the integral image generator 115 which produces integral image patches corresponding to the rectangles in a manner similar to the tracker integral image generator 115.

If acquired images are affected by external changes in the acquisition conditions, bad illumination or incorrect exposure, the number of faces detected or the current probability of a given face when compared with its historic cumulative probability could drop significantly even to the point where no faces in an image of a scene are detected. For example, a face may move from a region of frontal lighting into a region where is it subject to back-lighting, or side-lighting; or the overall lighting in a scene may suddenly be reduced (artificial lighting is turned off, or the scene moves from outdoors to indoors, etc).

In an attempt to avoid losing track of faces in a scene which might be detected/tracked, where the skin segmentation module 190 detects either that no candidate regions 145 are being tracked or the cumulative/current probability of candidate regions 145 is dropping significantly, the module 190 can adjust the criteria being applied to detect skin.

So, for example, in normal lighting conditions, skin segmentation criteria such as disclosed in U.S. Ser. No. 11/624,683 filed Jan. 18, 2007 (Ref: FN185) can be employed. So where image information is available in RGB format, if L>240, where L=0.3*R+0.59G+0.11B, or if R>G+K and R>B+K where K is a function of image saturation, a pixel is deemed to be skin. In YCC format, if Y>240 or if Cr>148.8162−0.1626*Cb+0.4726*K and Cr>1.2639*Cb−33.7803+0.7133*K, where K is a function of image saturation, a pixel is deemed to be skin.

Figure 4A:
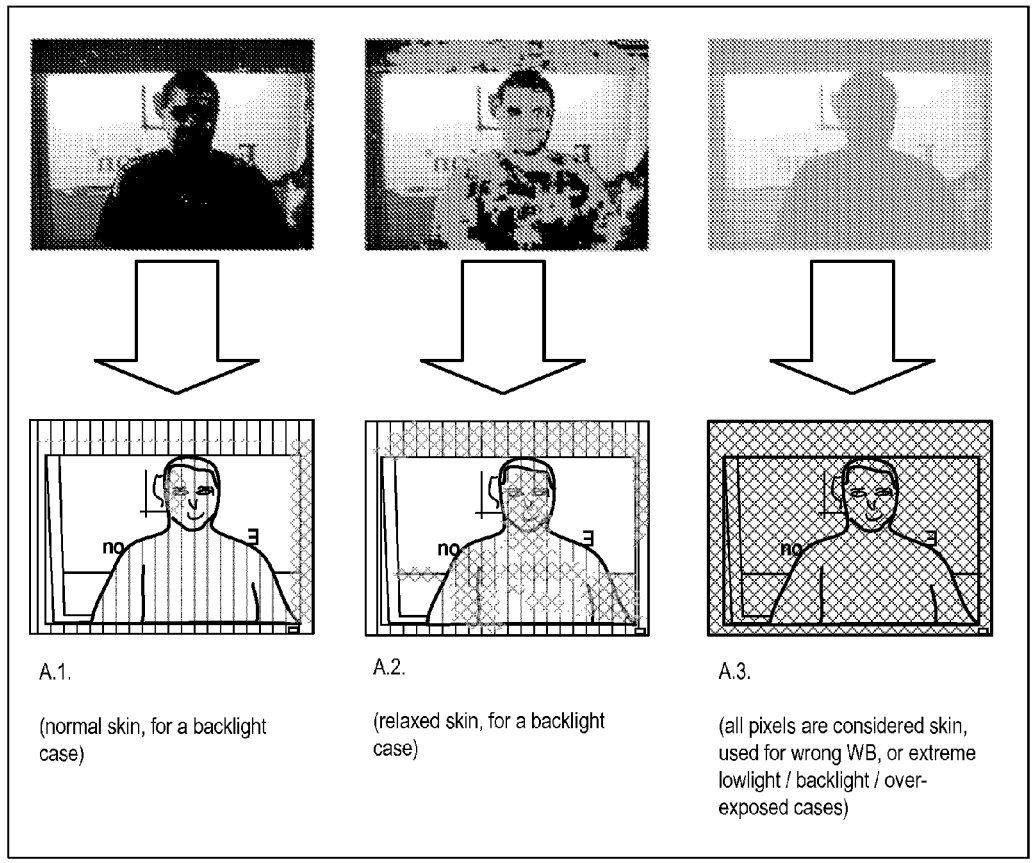
FIGS. 4(a) and 4(b) illustrate skin detection functions and contrast enhancement functions respectively for use in an embodiment of the invention.
Figure 4B:
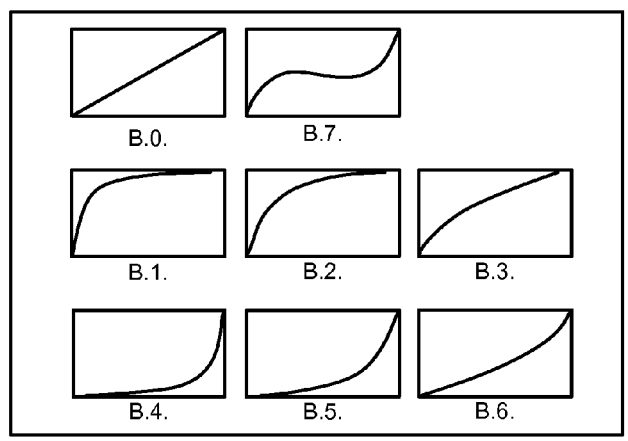

This produces the most limited skin map as illustrated in FIG. 4(*a*) as skin type A1 and so reduces the face detection processing overhead greatly.

However, in a poorly illuminated image, the variations of which are described in more detail later, a more relaxed skin criterion is employed. For example, in RGB format, if R>G, a pixel is deemed to be skin. In YCC format, if Cr+0.1626*Cb−148.8162>0, a pixel is deemed to be skin.

This produces a more extensive skin map as illustrated in FIG. 4(*a*) as skin type A2 to allow face detection, possibly with the benefit of contrast enhancement described later, to pick up on any potential face candidates.

Of course, for both skin types A1 and A2, other criteria can be employed for RGB, YCC or other formats such as LAB etc.

Where an image is either very poorly illuminated, very over exposed, where there is wrong white balance, or where there is unusual illumination, for example, a colored bulb, no skin segmentation is performed and all pixels are assumed to potentially include skin. This is referred to as skin type A3 and typically face detection is applied to such an image in conjunction with some form of contrast enhancement.

Applying appropriate skin segmentation prior to face detection, not alone reduces the processing overhead associated with producing the integral image and running face detection, but in the present embodiment, it also allows the face detector 120 to apply more relaxed face detection to the bounding rectangles, as there is a higher chance that these skin-tone regions do in fact contain a face. So for a VJ detector 120, a shorter classifier chain can be employed to more effectively provide similar quality results to running face detection over the whole image with longer VJ classifiers required to positively detect a face.

Further improvements to face detection are also contemplated in other embodiments. Again, based on the fact that face detection can be very dependent on illumination conditions, such that small variations in illumination can cause face detection to fail and cause somewhat unstable detection behavior, in another embodiment, confirmed face regions 145 are used to identify regions of a subsequently acquired sub-sampled image on which luminance correction [195] may be performed to bring regions of interest of the image to be analyzed to the desired parameters. One example of such correction is to improve the luminance contrast either across an entire image or within the regions of the sub-sampled image defined by confirmed face regions 145.

Contrast enhancement may be used to increase local contrast of an image, especially when the usable data of the image is represented by close contrast values. Through this adjustment, intensities of pixels of a region when represented on a histogram which would otherwise be closely distributed can be better distributed. This allows for areas of lower local contrast to gain a higher contrast without affecting global contrast. Histogram equalization accomplishes this by effectively spreading out the most frequent intensity values.

Where the luminance correction module 195 detects either that no candidate regions 145 are being tracked or the cumulative/current probability of candidate regions 145 is dropping significantly or that the quality of the image or candidate regions of an acquired image is not optimal, then contrast enhancement functions can be applied either to the entire image or the candidate regions prior to face detection. (If skin segmentation has been performed prior to luminance correction, then luminance correction need only be applied to regions of the image deemed to be skin.)

The contrast enhancement function can be implemented as a set of look up tables (LUT) applied to the image or candidate regions of the image for specific image quality conditions. In one implementation, illumination conditions can be determined from an analysis of luminance in a histogram of the image or candidate region. If there is a clear indication of whether the image/region is low-lit, backlit or over-exposed, then a contrast enhancing function such as shown in FIG. 4(*b*) to be applied by the correction module 195 can be selected and applied as follows:

B.0.—no contrast enhancement lut(i)=i

B.1.—for severe low-light conditions lut(i)=((L−1)*log(1+i))/log(L)

B.2.—for medium low-light conditions lut(i)=((L−1)*pow(i/(L−1), 0.4))

B.3.—for mild low-light conditions lut(i)=((L−1)*pow(i/(L−1), 0.5))

B.4.—for severe overexposure conditions lut(i)=(L−1)*(exp(i)−1)/(exp(L−1)−1)

B.5.—for medium overexposure conditions lut(i)=((L−1)*pow(i/(L−1), 1.4))

B.6.—for mild overexposure conditions lut(i)=((L−1)*pow(i/(L−1), 1.6))

B.7.—for a backlit image, which doesn't fall into the above categories, or for extreme lowlight/overexposed cases:
  if i<=T then lut(i)=(T*pow(i/T, r))
    else lut(i)=(L−1−(L−1−T)*pow((L−1−i)/(L−1−T),r))
  where T=100, r=0.4; and
  where L is the maximum value for luminance e.g. 256 for an 8-bit image.

It can therefore be seen that in the case of B2, B3, B5, B6, the general formula for contrast enhancement is lut(i)=((L−1)*pow(i/(L−1), r)), where r<1 is used in lowlight, and r>1 is used in highlight conditions.

In the case above, the measure of quality is an assessment of the relative illumination of a candidate region of an image or indeed an entire image from a luminance histogram of the region/image. So for example, a region/image can be categorized as subject to "severe low-light" if, excluding outlying samples, say the top 3%, the highest Y value of the region/image is less than 30. A region/image can be categorized as subject to "medium low-light" if, excluding outlying samples, say the top 3%, the highest Y value of the region/image is less than 50. A region/image can be categorized as subject to "severe overexposure" if, excluding outlying samples, say the bottom 3%, the lowest Y value of the region/image is more than 220.

Another measure a quality is based on a combination of luminance and luminance variance. So if a tracked region has poor contrast i.e. a low variance in luminance and the face is subject to "severe low-light" as above, contrast enhancement can be set to B.1. If a tracked region doesn't have good contrast and the face is subject to any form of overexposure, then contrast enhancement can be set to B.4. If the contrast on the face is very good i.e. high variance in luminance, enhancement can be set to B.0.

If an intermediate level of contrast were detected, then either no change to contrast enhancement would be made or the decision to change contrast enhancement could be based completely on maximum/minimum luminance values.

In each case, an adjustment of the contrast enhancement function to take into account poor image quality can be accompanied by having the skin segmentation module 190 switch from skin type A1 to A2 or from to skin type A1 or A2 to A3.

The method is useful in images with backgrounds and foregrounds that are both bright or both dark. In particular, the method can lead to better detail in photographs that are overexposed or under-exposed.

Alternatively, this luminance correction can be included in the computation of an "adjusted" integral image in the generators 115.

In another improvement, when face detection is being used, the camera application is set to dynamically modify the exposure from the computed default to a higher values (from frame to frame, slightly overexposing the scene) until the face detection provides a lock onto a face.

Further embodiments providing improved efficiency for the system described above are also contemplated. For example, face detection algorithms typically employ methods or use classifiers to detect faces in a picture at different orientations: 0, 90, 180 and 270 degrees. The camera may be equipped with an orientation sensor 170, as illustrated at FIG. 1. This can include a hardware sensor for determining whether the camera is being held upright, inverted or tilted clockwise or anti-clockwise. Alternatively, the orientation sensor can comprise an image analysis module connected either to the image acquisition hardware 105, 110 or camera memory 140 or image store 150 for quickly determining whether images are being acquired in portrait or landscape mode and whether the camera is tilted clockwise or anti-clockwise.

Once this determination is made, the camera orientation can be fed to one or both of the face detectors 120, 121. The detectors may apply face detection according to the likely orientation of faces in an image acquired with the determined camera orientation. This feature can either significantly reduce the face detection processing overhead, for example, by avoiding the employment of classifiers which are unlikely to detect faces or increase its accuracy by running classifiers more likely to detects faces in a given orientation more often.

Figure 2:
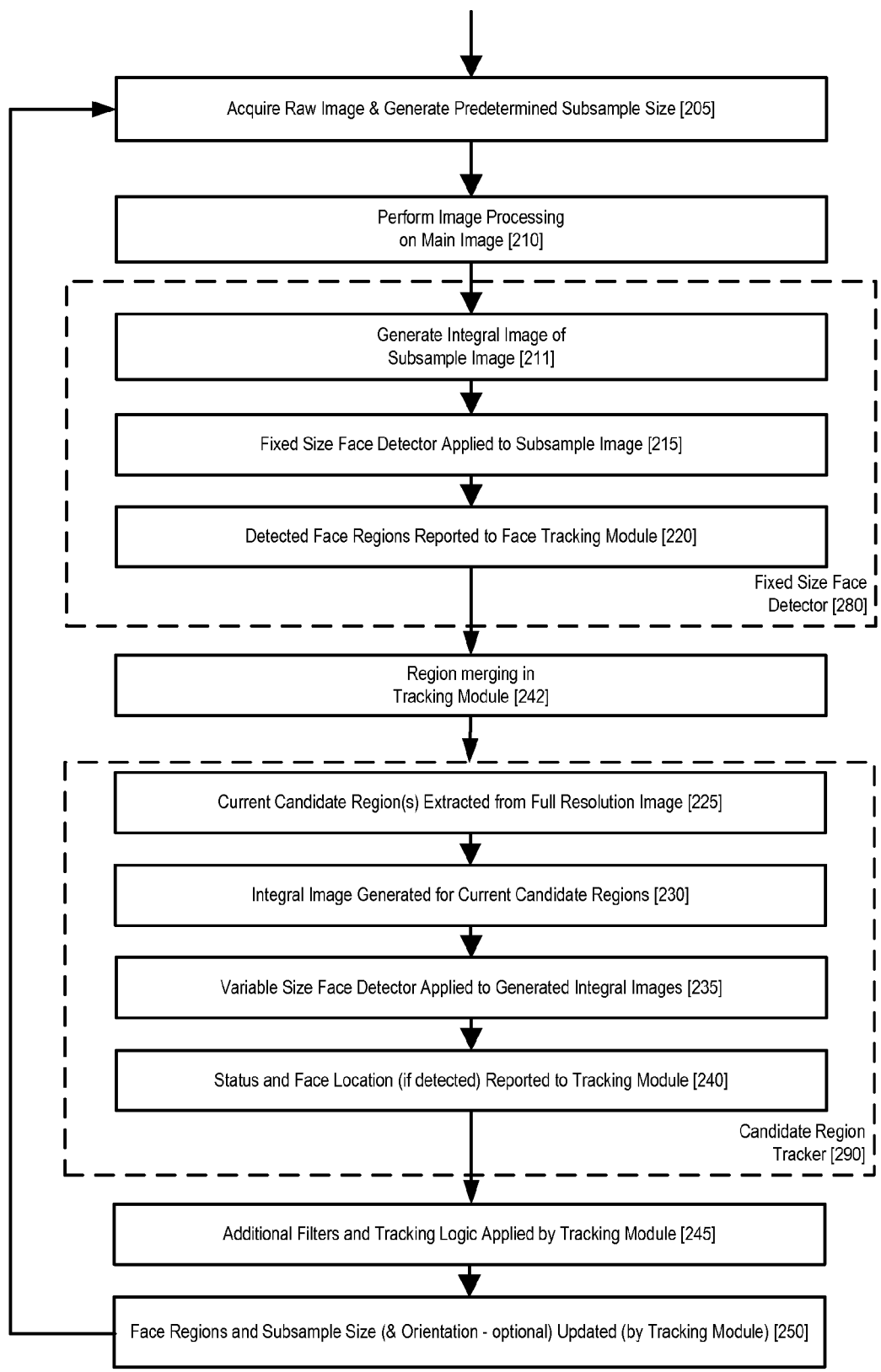
FIG. 2 is a flow diagram illustrating operation of the image processing apparatus of FIG. 1.

FIG. 2 illustrates a main workflow in accordance with a preferred embodiment. The illustrated process is split into (i) a detection/initialization phase which finds new candidate face regions [141] using a fast face detector [280] which operates on a sub-sampled version of the full image; (ii) a secondary face detection process [290] which operates on extracted image patches for candidate regions [142], which are determined based on locations of faces in one or more previously acquired image frames, and (iii) a main tracking process which computes and stores a statistical history of confirmed face regions [143]. Although the application of the fast face detector [280] is shown occurring prior to the application of the candidate region tracker [290] in FIG. 2, the order is not critical and the fast detection is not necessarily executed on every frame or in certain circumstances may be spread across multiple frames.

Thus, in step 205 the main image is acquired and in step 210 primary image processing of that main image is performed as described in relation to FIG. 1. The sub-sampled image is generated by the sub-sampler [112] and an integral image is generated therefrom by the generator [115] at step 211. The integral image is passed to the fixed size face detector [120] and the fixed size window provides a set of candidate face regions [141] within the integral image to the face tracking module step 220. The size of these regions is determined by the sub-sampling scale [146] specified by the face tracking module to the sub-sampler and this scale is preferably based on an analysis of previous sub-sampled/integral images by the detector [280] and patches from previous acquired images by the tracker [290] as well perhaps as other inputs such as camera focus and movement.

The set of candidate regions [141] is merged with the existing set of confirmed regions [145] to produce a merged set of candidate regions [142] to be provided for confirmation at step 242.

For the candidate regions [142] specified by the face tracking module 111, the candidate region extractor [125] extracts the corresponding full resolution patches from an acquired image at step 225. An integral image is generated for each extracted patch at step 230 and a variable-size face detection is applied by the face detector 121 to each such integral image patch, for example, a full Viola-Jones analysis. These results [143] are in turn fed back to the face-tracking module [111] at step 240.

The tracking module [111] processes these regions [143] further before a set of confirmed regions [145] is output. In this regard, additional filters can be applied by the module 111 either for regions [143] confirmed by the tracker [290] or for retaining candidate regions [142] which may not have been confirmed by the tracker 290 or picked up by the detector [280] at step 245. For example, if a face region had been tracked over a sequence of acquired images and then lost, a skin prototype could be applied to the region by the module [111] to check if a subject facing the camera had just turned away. If so, this candidate region may be maintained for checking in a next acquired image whether the subject turns back to face the camera.

Depending on the sizes of the confirmed regions being maintained at any given time and the history of their sizes, e.g. are they getting bigger or smaller, the module 111 determines the scale [146] for sub-sampling the next acquired image to be analyzed by the detector [280] and provides this to the sub-sampler [112] step 250.

The fast face detector [280] need not run on every acquired image. So, for example, where only a single source of sub-sampled images is available, if a camera acquires 60 frames per second, 15-25 sub-sampled frames per second (fps) may be required to be provided to the camera display for user previewing. Clearly, these images need to be sub-sampled at the same scale and at a high enough resolution for the display. Some or all of the remaining 35-45 fps can be sampled at the scale required by the tracking module [111] for face detection and tracking purposes.

The decision on the periodicity in which images are being selected from the stream may be based on a fixed number or alternatively be a run-time variable. In such cases, the decision on the next sampled image may be determined on the processing time it took for the previous image, in order to maintain synchronicity between the captured real-time stream and the face tracking processing. Thus in a complex image environment, the sample rate may decrease.

Alternatively, the decision on the next sample may also be performed based on processing of the content of selected images. If there is no significant change in the image stream, the full face tracking process might not be performed. In such cases, although the sampling rate may be constant, the images will undergo a simple image comparison and only if it is decided that there is justifiable differences, will the face tracking algorithms be launched.

The face detector [280] also need not run at regular intervals. So for example, if the camera focus is changed significantly, then the face detector may be run more frequently and particularly with differing scales of sub-sampled images to try to detect faces which should be changing in size. Alternatively, where focus is changing rapidly, the detector [280] could be skipped for intervening frames, until focus has stabilized. However, it is generally when focus goes to approximately infinity that the highest resolution integral image is to be produced by the generator [115].

In this latter case, the detector may not be able to cover the entire area of the acquired, subsampled, image in a single frame. Accordingly the detector may be applied across only a portion of the acquired, subsampled, image on a first frame, and across the remaining portion(s) of the image on one or more subsequent acquired image frames. In a one embodiment, the detector is applied to the outer regions of the acquired image on a first acquired image frame in order to catch small faces entering the image from its periphery, and on subsequent frames to more central regions of the image.

In a separate embodiment, the face detector 120 will be applied only to the regions that are substantively different between images. Note that prior to comparing two sampled images for change in content, a stage of registration between the images may be needed to remove the variability of changes in camera, caused by camera movement such as zoom, pan and tilt.

In alternative embodiments, sub-sampled preview images for the camera display can be fed through a separate pipe than the images being fed to and supplied from the image sub-sampler [112] and so every acquired image and its sub-sampled copies can be available both to the detector [280] as well as for camera display.

In addition to periodically acquiring samples from a video stream, the process may also be applied to a single still image acquired by a digital camera. In this case, the stream for the face tracking may include a stream of preview images, and the final image in the series may be the full resolution acquired image. In such a case, the face tracking information can be verified for the final image in a similar fashion to that described in FIG. 2. In addition, information such as coordinates or mask of the face may be stored with the final image. Such data may fit as an entry in a saved image header, for example, for future post-processing, whether in the acquisition device or at a later stage by an external device.

As mentioned above, to perform well, face detection and tracking requires images with good contrast and color definition. In preferred embodiments of the present invention, as an alternative to or in addition to correcting the luminance and contrast of candidate face regions 145, the module 195 can adaptively change the contrast of acquired images of a scene where no faces have been detected, i.e. no candidate regions 145, such that adverse effects due to illumination, exposure or white balance are reduced.

As can be seen from FIGS. 4(a) and (b), there are many possible permutations of skin segmentation (A1/A2/A3) and contrast enhancement (B0/B1/B2/B3/B4/B5/B6/B7) which could be used to lock onto one or more faces. If all of these were to be checked across a sequence of frames, then a long searching loop could be required and the lag for locking onto a face may be unacceptably long.

Figure 5:
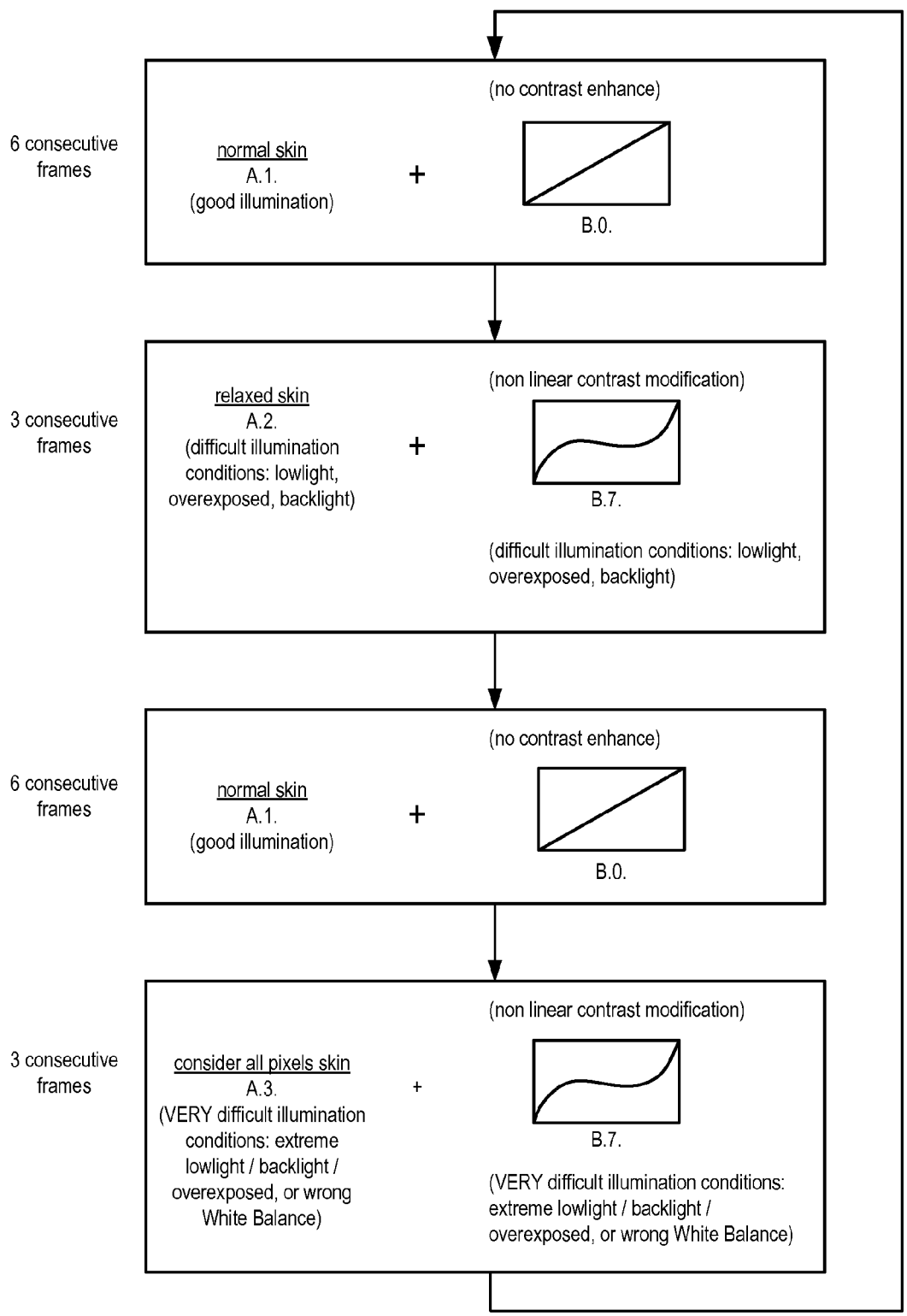
FIG. 5 shows a flow diagram for acquiring a face in an embodiment of the invention.

Thus, in one embodiment, if there no candidate regions 145 from previous frames supplied from the face tracking module 111, the modules 190 and 195 operate according to the steps illustrated in FIG. 5, to attempt to detect a face region.

Preferably, the modules 190,195 are biased towards searching with a normal skin map (A1) and without contrast enhancement (B0) and so the modules process sequences of frames in response to no candidate regions being found in a frame as follows:

in a first 6 consecutive frames, the modules 190,195 use the normal skin segmentation and contrast enhancement cases (A.1+B.0);

in the next 3 consecutive frames, the modules use a relaxed case (A.2+B.7);

in a next 6 consecutive frames, the modules again use the normal case (A1+B.0); and in the next 3 consecutive frames, the modules use a very-relaxed case (A.3+B.7) before repeating the loop.

As can be seen, only few general cases (A.1+B.0; A.2+B.7; A.3+B.7) are employed within this loop and if one of these combinations produces at least one candidate face region, then the modules 190, 195 stop searching and continue to use the successful A/B setting unless current/cumulative probability for candidate region(s) 145 being tracked or image quality changes. Then, either skin segmentation or contrast enhancement can be further changed to any one of functions A1 . . . A3 or B0 . . . B7 in accordance with the illumination of a frame being analysed. Nonetheless, in the absence of a change in image illumination, using the setting produced from searching provides a better lock on detected faces.

In spite of the modules 190,195 adjusting the skin segmentation and contrast enhancement for candidate regions 145, if at any time the list of candidate regions 145 becomes empty again, the modules 190,195 begin searching for the appropriate skin segmentation and contrast enhancement function in accordance with FIG. 5.

It should be noted that it is possible for a face to be in a normal condition (good illumination, good contrast), and to be detected with relaxed conditions such as A.2+B.7, for example, if the face just returned from a profile. As such, it is always possible for either of the modules 190,195 to normalise contrast enhancement or tighten skin segmentation, once the current/cumulative probability for tracked face regions exceeds a given threshold or if the quality of the images in terms of contrast, skin percentage and face illumination improves.

Skin percentage is counted as the number of pixels in an image regarded as normal skin, i.e. satisfying the A1 criteria, and the number regarded as relaxed skin, i.e. satisfying the A2 criteria.

If there is sufficient normal skin in a frame, then the skin segmentation module can be set to skin type A1, whereas if there is insufficient normal skin vis-à-vis relaxed skin on this face, the skin segmentation module can be set to skin type A2 or even A3. This dynamic change in skin segmentation can be necessary if a face changes its orientation in plane or out of the plane, or if a camera's automatic white balancing (AWB) modifies the colors in acquiring a stream of images.

As an alternative or in addition to the above steps, when a face is detected through the steps of FIG. 5, a check to determine if the most appropriate skin segmentation is being used can be performed to ensure the minimal amount of face detection is being carried out to track face regions. So over the next two frames following detection of a face, either by cycling from A1->A2->A3 or from A3->A2->A1, skin segmentation can be varied to restrict as much as possible the area to which face detection is applied and still track detected faces.

The following are some exemplary scenarios indicating the changes in skin segmentation and contrast enhancement during acquisition of a face region:

---

Scenario 1 - wrong WhiteBalance

...
=> countFramesFromLastDetection = 1
=> set the normal case (A.1+B.0)
...
=> countFramesFromLastDetection = 7
=> set the case (A.2+B.7)
...
=> countFramesFromLastDetection = 16
=> set the case (A.3+B.7)
=> detected one face
=> analyze the skin in the face region
  => normal skin percent is 0%, relaxed skin percent is 3%
  => A.3 will be used next frame...
=> analyze the luminance/contrast in the face region
  => good contrast (variance on the face > 1500)
  => set the enhance B.0
...

---

Scenario 2 - normal skin, good illumination

...
=> countFramesFromLastDetection = 1
=> set the normal case (A.1+B.0)
=> detected one face
=> analyze the skin in the face region
  => normal skin percent is 80%, relaxed skin percent is 95%
  => A.1 will be used for the next frame...
=> analyze the luminance/contrast in the face region
  => good contrast (variance on the face > 1500)
  => set the enhance B.0
...

---

Scenario 3 - backlight medium (relaxed skin type, and contrast enhance type medium)

...
=> countFramesFromLastDetection = 7
=> set the case (A.2+B.7)
=> one face detected
=> analyze the skin in the face region
  => normal skin percent is 30%, relaxed skin percent is 80%
  => A.2 will be used for the next frame...
=> analyze the luminance/contrast in the face region
  => maximum face histogram luminance < 50
  => enhance contrast lowlight medium (B.2)
...

---

Scenario 4 - strong lowlight

=> countFramesFromLastDetection = 1
=> set the normal case (A.1+B.0.)

---

Scenario 4 - strong lowlight (continued)

=> maximum frame histogram luminance < 30
  => enhance contrast lowlight strong (B.3), and set skin segmentation (A.3)
...
=> one face detected
=> analyze the skin in the face region
  => normal skin percent is 5%, relaxed skin percent is 15%
  => no contrast enhance modification
  => set skin segmentation to A.3
=> analyze the luminance/contrast in the face region
  => maximum face histogram luminance < 30
  => enhance contrast lowlight strong (B.3)
...
=> countFramesFromLastDetection = 0 (because we have a new detected face in the list)
=> do nothing (because we have a new detected face in the list)
=> maximum frame histogram luminance < 30
  => enhance contrast lowlight strong (B.3), and set skin segmentation (A.3)
=> re-detected the face
=> no new face detected
=> analyze the skin in the face region
  => normal skin percent is 5%, relaxed skin percent is 15%
  => no contrast enhance modification
  => set skin segmentation (A.3)
=> analyze the luminance/contrast in the face region
  => maximum face histogram luminance < 30
  => enhance contrast lowlight strong (B.3)
...

---

FIG. 3 illustrates operation in accordance with a preferred embodiment through a more general worked example not dependent on skin segmentation and contrast enhancement. FIG. 3(a) illustrates a result at the end of a detection and tracking cycle on a frame of video, with two confirmed face regions [301, 302] of different scales being shown. In this exemplary embodiment, for pragmatic reasons, each face region has a rectangular bounding box. Although it is easier to make computations on rectangular regions, different shapes can be used. This information is recorded and output as [145] by the tracking module [111] of FIG. 1.

Based on a history of the face regions [301,302], the tracking module [111] may decide to run fast face tracking with a classifier window of the size of face region [301] with an integral image being provided and analyzed accordingly.

Figure 3A:
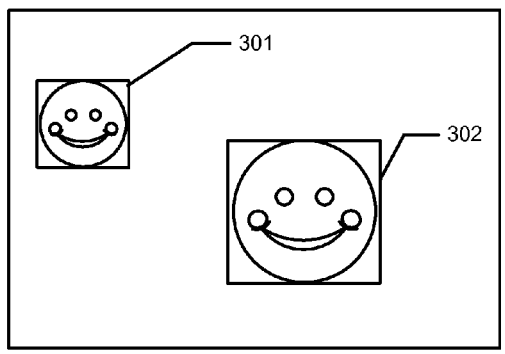
FIGS. 3(a) to 3(d) illustrate examples of images processed by an apparatus in accordance with a preferred embodiment.
Figure 3B:
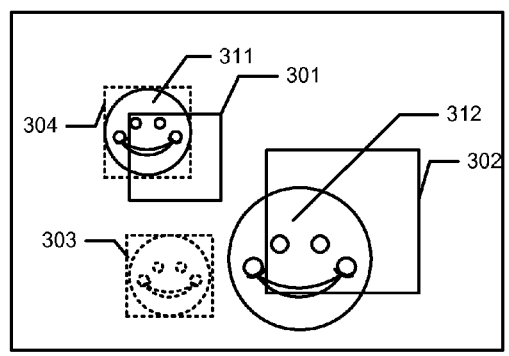
Figure 3C:
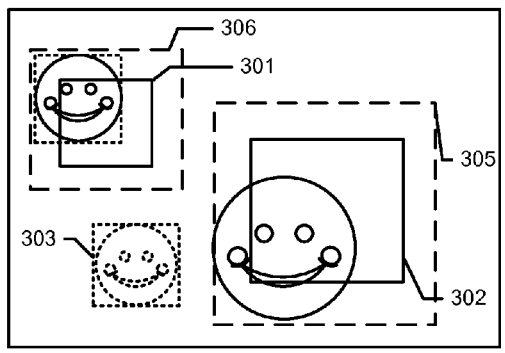

FIG. 3(b) shows the situation after the next frame in a video sequence is captured and the fast face detector has been applied to the new image. Both faces have moved [311, 312] and are shown relative to previous face regions [301, 302]. A third face region [303] has appeared and has been detected by the fast face detector [303]. In addition, a fast face detector has found the smaller of the two previously confirmed faces [304], because it is at the correct scale for the fast face detector. Regions [303] and [304] are supplied as candidate regions [141] to the tracking module [111]. The tracking module merges this new candidate region information [141], with the previous confirmed region information [145] comprising regions [301] [302] to provide a set of candidate regions comprising regions [303], [304] and [302] to the candidate region extractor [290]. The tracking module [111] knows that the region [302] has not been picked up by the detector [280]. This may be because the face has either disappeared, remains at a size that was too large or small to be detected by the detector [280] or has changed size to a size that the detector [280] was unable to detect. Thus, for this region, the module [111] will preferably specify a large patch [305]. Referring to FIG. 3(c), this patch [305] is around the region [302] to be checked by the tracker [290]. Only the region [303] bounding the newly detected face candidate will preferably be checked by the tracker [290], whereas because the face [301] is moving, a relatively large patch [306] surrounding this region is specified to the tracker [290].

FIG. 3(c) shows the situation after the candidate region extractor operates upon the image. Candidate regions [306, 305] around both of the confirmed face regions [301, 302] from the previous video frame as well as new regions [303] are extracted from the full resolution image [130]. The size of these candidate regions has been calculated by the face tracking module [111] based partly on statistical information relating to the history of the current face candidate and partly on external metadata determined from other subsystems within the image acquisition system. These extracted candidate regions are now passed on to the variable sized face detector [121] which applies a VJ face detector to the candidate region over a range of scales. The locations of any confirmed face regions are then passed back to the face tracking module [111].

Figure 3D:
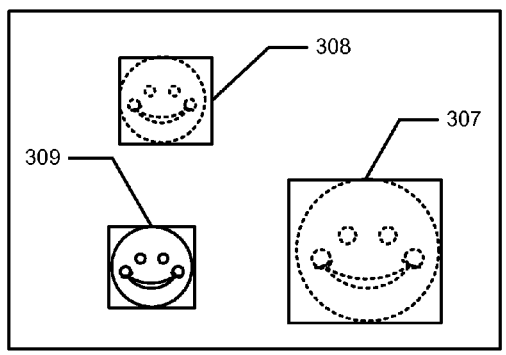

FIG. 3(d) shows the situation after the face tracking module [111] has merged the results from both the fast face detector [280] and the face tracker [290] and applied various confirmation filters to the confirmed face regions. Three confirmed face regions have been detected [307, 308, 309] within the patches [305,306,303] shown in FIG. 3(d). The largest region [307] was known, but had moved from the previous video frame, and relevant data is added to the history of that face region. Another previously known region [308] which had moved was also detected by the fast face detector which serves as a double-confirmation, and these data are added to its history. Finally a new face region [303] was detected and confirmed and a new face region history is then initiated for this newly detected face. These three face regions are used to provide a set of confirmed face regions [145] for the next cycle.

It will be seen that there are many possible applications for the regions 145 supplied by the face tracking module. For example, the bounding boxes for each of the regions [145] can be superimposed on the camera display to indicate that the camera is automatically tracking detected face(s) in a scene. This can be used for improving various pre-capture parameters. One example is exposure, ensuring that the faces are well exposed. Another example is auto-focusing, by ensuring that focus is set on a detected face or indeed to adjust other capture settings for the optimal representation of the face in an image.

The corrections may be done as part of pre-processing adjustments. The location of the face tracking may also be used for post processing, and in particular selective post processing, where regions with faces may be enhanced. Such examples include sharpening, enhancing, saturating, brightening or increasing local contrast, or combinations thereof. Preprocessing using the locations of faces may also be used on regions without a face to reduce their visual importance, for example, through selective blurring, desaturating, or darkening.

Where several face regions are being tracked, then the longest lived or largest face can be used for focusing and can be highlighted as such. Also, the regions [145] can be used to limit areas on which, for example, red-eye processing is performed (see, e.g., U.S. published patent applications numbers 2004/0223063, 2005/0031224, 2005/0140801, and 2004/0041121, and U.S. Pat. Nos. 6,407,777 and 7,042,505, which are hereby incorporated by reference).

Other post-processing which can be used in conjunction with light-weight face detection is face recognition. In particular, such an approach can be useful when combined with more robust face detection and recognition either running on the same device or an off-line device that has sufficient resources to run more resource-consuming algorithms In this case, the face tracking module [111] reports the locations of confirmed face regions [145] to the in-camera firmware, preferably together with a confidence factor.

When the confidence factor is sufficiently high for a region, indicating that at least one face is in fact present in an image frame, the camera firmware runs a light-weight face recognition algorithm [160] at the location of the face, for example a DCT-based algorithm. The face recognition algorithm [160] uses a database [161] preferably stored on the camera comprising personal identifiers and their associated face parameters.

In operation, the module [160] collects identifiers over a series of frames. When the identifiers of a detected face tracked over a number of preview frames are predominantly of one particular person, that person is deemed by the recognition module to be present in the image. The identifier of the person, and the last known location of the face, are stored either in the image (in a header) or in a separate file stored on the camera storage [150]. This storing of the person's ID can occur even when a recognition module [160] fails for the immediately previous number of frames, but for which a face region was still detected and tracked by the module [111].

When the image is copied from camera storage to a display or permanent storage device such as a PC (not shown), persons' ID's are copied along with the images. Such devices are generally more capable of running a more robust face detection and recognition algorithm and then combining the results with the recognition results from the camera, giving more weight to recognition results from the robust face recognition (if any). The combined identification results are presented to the user, or if identification was not possible, the user is asked to enter the name of the person that was found. When the user rejects an identification or a new name is entered, the PC retrains its face print database and downloads the appropriate changes to the capture device for storage in the light-weight database [161].

When multiple confirmed face regions [145] are detected, the recognition module [160] can detect and recognize multiple persons in the image.

It is possible to introduce a mode in the camera that does not take a shot until persons are recognized or until it is clear that persons are not present in the face print database, or alternatively displays an appropriate indicator when the persons have been recognized. This allows reliable identification of persons in the image.

This feature of a system in accordance with a preferred embodiment solves a problem with algorithms that use a single image for face detection and recognition and may have lower probability of performing correctly. In one example, for recognition, if a face is not aligned within certain strict limits it becomes very difficult to accurately recognize a person. This method uses a series of preview frames for this purpose as it can be expected that a reliable face recognition can be done when many more variations of slightly different samples are available.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections themselves, are hereby incorporated by reference into the detailed description of the preferred embodiments as disclosing alternative embodiments and components.

The invention claimed is:

1. A method of detecting faces in an image stream, comprising:
   receiving an acquired image from said image stream including one or more face regions;
   sub-sampling said acquired image at a specified resolution to provide a sub-sampled image;
   identifying one or more regions of said acquired image predominantly including skin tones;
   calculating a corresponding integral image for at least one of said skin tone regions of said sub-sampled acquired image;
   applying face detection to at least a portion of said integral image to provide a set of one or more candidate face regions each having a given size and a respective location; and
   responsive to failing to detect at least one face region for said image, enhancing the contrast of the luminance characteristics for at least a region corresponding to one of said skin tone regions in a subsequently acquired image.

2. A method as claimed in claim 1, in a face detection mode of said digital image acquisition device, each new acquired image is acquired with progressively increased exposure parameters until at least one candidate face region is detected.

3. A method as claimed in claim 1, wherein said enhancing is responsive to a maximum value of said luminance being below a threshold value to increase low values of luminance of said candidate region or said acquired image.

4. A method as claimed in claim 1, wherein said enhancing is responsive to a minimum value of said luminance being above a threshold value to decrease high values of luminance of said candidate region or said acquired image.

5. A method as claimed in claim 1, wherein said enhancing is responsive to a value of said variance of said luminance being above a threshold value to stop enhancing said candidate region or said acquired image.

6. An image processing apparatus including one or more processors and one or more digital storage media having digitally-encoded instructions embedded therein for programming the one or more processors to perform an iterative method of detecting faces in an image stream, the method comprising:
   receiving an acquired image from said image stream including one or more face regions;
   sub-sampling said acquired image at a specified resolution to provide a sub-sampled image;
   identifying one or more regions of said acquired image predominantly including skin tones;
   calculating a corresponding integral image for at least one of said skin tone regions of said sub-sampled acquired image;
   applying face detection to at least a portion of said integral image to provide a set of one or more candidate face regions each having a given size and a respective location; and
   responsive to failing to detect at least one face region for said image, enhancing the contrast of the luminance characteristics for at least a region corresponding to one of said skin tone regions in a subsequently acquired image.

7. An apparatus as claimed in claim 6, in a face detection mode of said apparatus, each new acquired image is acquired with progressively increased exposure parameters until at least one candidate face region is detected.

8. An apparatus as claimed in claim 6, wherein said enhancing is responsive to a maximum value of said luminance being below a threshold value to increase low values of luminance of said candidate region or said acquired image.

9. An apparatus as claimed in claim 6, wherein said enhancing is responsive to a minimum value of said luminance being above a threshold value to decrease high values of luminance of said candidate region or said acquired image.

10. An apparatus as claimed in claim 6, wherein said enhancing is responsive to a value of said variance of said luminance being above a threshold value to stop enhancing said candidate region or said acquired image.

11. One or more non-transitory processor-readable digital storage media having digitally-encoded instructions embedded therein for programming one or more processors to perform an iterative method of detecting faces in an image stream, the method comprising:
   receiving an acquired image from said image stream including one or more face regions;
   sub-sampling said acquired image at a specified resolution to provide a sub-sampled image;
   identifying one or more regions of said acquired image predominantly including skin tones by applying one of a number of filters to define said one or more regions of said acquired image predominantly including skin tones, at least one of said filters including a restrictive skin filter and at least one of said filters including a relaxed skin filter;
   calculating a corresponding integral image for at least one of said skin tone regions of said sub-sampled acquired image;
   applying face detection to at least a portion of said integral image to provide a set of one or more candidate face regions each having a given size and a respective location; and
   responsive to failing to detect at least one face region for said image, enhancing the contrast of the luminance characteristics for at least a region corresponding to one of said skin tone regions in a subsequently acquired image.

12. One or more non-transitory processor-readable digital storage media as claimed in claim 11, wherein said enhancing is responsive to a maximum value of said luminance being below a threshold value to increase low values of luminance of said candidate region or said acquired image.

13. One or more non-transitory processor-readable digital storage media as claimed in claim 11, wherein said enhancing is responsive to a minimum value of said luminance being above a threshold value to decrease high values of luminance of said candidate region or said acquired image.

14. One or more non-transitory processor-readable digital storage media as claimed in claim 11, wherein said enhancing is responsive to a value of said variance of said luminance being above a threshold value to stop enhancing said candidate region or said acquired image.

* * * * *